M. HAUPT.
MOTOR VEHICLE.
APPLICATION FILED AUG. 25, 1919.
1,353,393.
Patented Sept. 21, 1920.
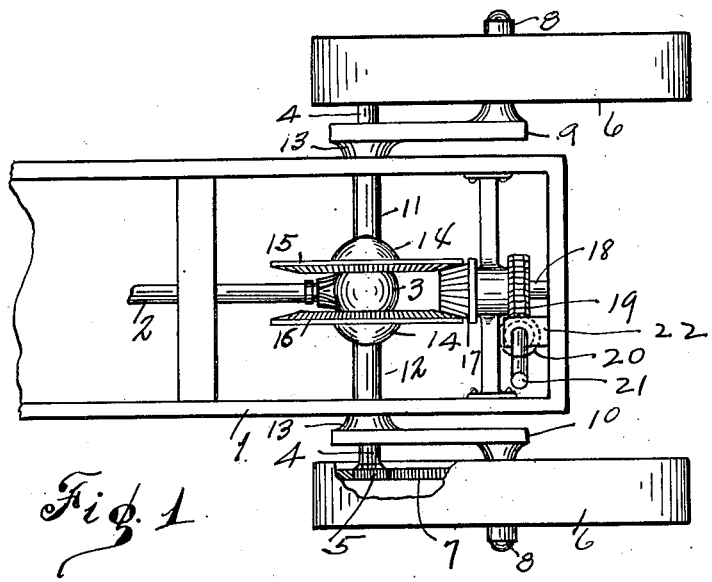
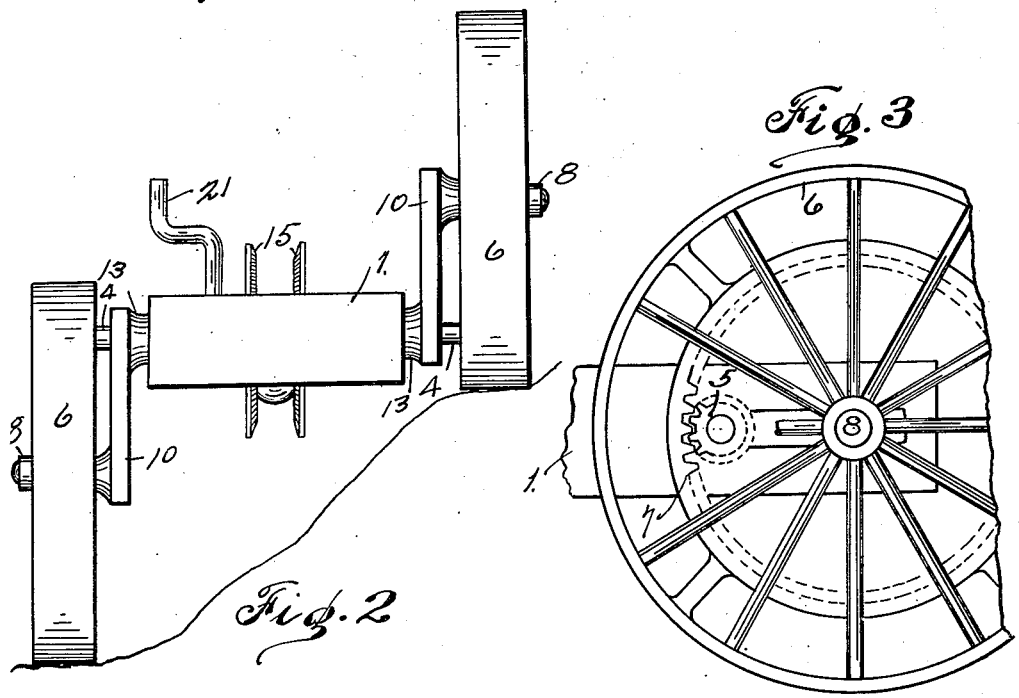
Inventor
Mathias Haupt
By Herbert E. Smith
Attorney

UNITED STATES PATENT OFFICE.

MATHIAS HAUPT, OF SPOKANE, WASHINGTON.

MOTOR-VEHICLE.

1,353,393.  Specification of Letters Patent.  Patented Sept. 21, 1920.

Application filed August 25, 1919. Serial No. 319,614.

*To all whom it may concern:*

Be it known that I, MATHIAS HAUPT, a citizen of the United States, residing at Spokane, in the county of Spokane and State of Washington, have invented certain new and useful Improvements in Motor-Vehicles, of which the following is a specification.

In the cultivation of the soil, especially in plowing, in hilly and mountainous countries, one of the problems difficult of solution has been the adaptation of tractor machines for pulling plows, because of the fact that the steep declivity of the hill renders it impossible for tractors of ordinary construction to stay on the hill without toppling over, or sliding down the incline. The use of horses in this connection is very expensive, as the work is extremely hard, and the horses are quickly worn out during the cultivation season.

To overcome these difficulties and objections I have devised a driving tractor for the machine or tractor machine involving the utilization of a pair of rear traction wheels that are so connected together, and operable, that each will remain in vertical position at all times, but are adjustable with relation to each other so that the tread of one wheel may be at a much lower level than the other wheel and yet maintain the truck or truck frame in horizontal position.

In the accompanying drawings I have illustrated one example of the physical embodiment of my invention which has been in actual and successful use on hilly soil, on hills with a pitch as high as sixty five degrees, the parts being arranged and combined according to the best mode I have so far devised for the practical application of the principles of my invention.

Figure 1 is a top plan view of a sufficient portion of a tractor machine for illustrating the application thereto of the present invention.

Fig. 2 is a rear view of the tractor wheels, at different altitudes, on the side of a hill, and Fig. 3 is an outer, side view of one of the tractor wheels and its connections.

In the preferred form of the invention as now actually in use, the customary rectangular chassis or truck frame 1 is utilized, and in connection therewith the driving or engine shaft 2 is shown operatively connected with the differential transmission 3 from which the two sections 4, 4 of the rear driving axle or shaft, arranged transversely of the machine, are driven as usual to operate the two driving pinions 5 at the end of the shaft sections.

The two drive wheels 6, 6, are preferably of metal with wide treads adapting them for use in soft soil, and each wheel is equipped with an internal gear ring 7 with which one of the pinions 5 engages to drive these traction wheels.

The drive wheels are revoluble on their journals 8 which project angularly from the respective crank arms 9 and 10 at the sides of the frame, and these arms are integral members with the respective housing sections 11 and 12 which incase the shaft sections 4 and are journaled in the side members of the frame 1, an annular bearing shoulder 13 being provided on each housing outside the frame 1 for holding the housings in position.

These housings form a crank axle, on the driving shaft 4 and journaled in the frame, for the wheels 6, and the inner ends of the housings are fashioned with hollow-hemispherical heads 14 to accommodate the transmission casing 3, which heads merge into comparatively large bevel gear wheels 15 and 16 on the respective housings or hollow crank shafts, the two gear wheels facing each other at the center of the tractor machine, and adapted to be rotated in opposite directions through the instrumentality of the common bevel pinion 17 revoluble on the longitudinal stub shaft or axle 18 projecting from the rear member of the tractor frame.

The bevel pinion is formed with a sleeve which has an integral worm gear 19 engaged by the worm wheel 20, and the latter is turned by the crank handle 21 journaled in the bracket 22 on the frame.

The crank 21 may be turned by suitable power, and it will be noted that the actuating gears do not require any locking mechanism for holding the wheels in adjusted position, for the friction of the worm gears and bevel gears are sufficient to hold the rotatable mechanism in adjusted position.

In Fig. 1 the two wheels are shown with their respective journals alined and in the same plane, and the crank arms also are alined, the whole machine being on a level, with the wheel journals at the rear of the drive shaft or axles 4, but it will be apparent that the same relation of parts may be maintained, with the wheel journals in advance of the driving axles if desired. By manipulation of the crank handle 21, it will be seen that the two hollow crank shafts or housings 11 and 12 will be revolved in opposite directions through the instrumentality of the pinion and bevel gears, and the wheels 6, 6, may be manipulated to position as indicated in Fig. 2 where the two wheel journals are at different altitudes, but both wheels in vertical position and traveling along on the side of the hill with the tractor frame in horizontal position. In all positions the driving pinions 5 are in mesh with the internal gear ring of the two wheels 6, 6, and the position of the two wheels may be adjusted, continuously if required to meet the different conditions of the surface traveled over.

Changes and alterations may be made within the scope of the appended claims, without departing from the spirit of my invention, and, though the machine as illustrated is in actual and successful use, some changes may be required to adapt it for different uses.

What I claim is—

1. The combination with the vehicle frame, the engine shaft, and sectional countershaft with driving pinions thereon, of a pair of oppositely movable hollow crank shafts on the countershaft and means for moving said crank shafts, a pair of drive wheels on the crank shafts, and a gearing on each wheel engaged by said driving pinions.

2. The combination with the frame, sectional driving shaft, and driving pinions thereon, of a pair of hollow crank shafts on the countershaft and traction wheels on said crank shafts provided with gearing for said pinions, bevel gears on the crank shaft ends and a pinion engaging said gears, and means for operating the latter pinion to revolve the bevel gears and crank shafts in opposite directions.

3. The combination with the frame, countershafts and traction wheels operated from the countershafts, of spaced housings on the countershafts and means for revolving them in opposite directions, and a crank arm on each housing having a journal to support a traction wheel.

4. The combination with the frame and sectional counter shaft with end driving pinions and traction wheels with internal gear rings for said pinions, of a pair of housings on the countershafts journaled in the frame and provided with crank arms upon which the traction wheels are journaled, the adjacent ends of said housings having bevel gears, a bevel pinion engaging said gears, and means for turning said pinion.

In testimony whereof I affix my signature.

MATHIAS HAUPT.